United States Patent [19]

Taylor

[11] Patent Number: 4,867,286
[45] Date of Patent: Sep. 19, 1989

[54] SHOCK ABSORBER HAVING FLUID AMPLIFIED PISTON HEAD WITH RELIEF VALVE WHICH PROVIDES SECOND STAGE OF FLUID AMPLIFICATION

[75] Inventor: Douglas P. Taylor, North Tonawanda, N.Y.

[73] Assignee: Tayco Developments, Inc., North Tonawanda, N.Y.

[21] Appl. No.: 573,573

[22] Filed: Jan. 25, 1984

[51] Int. Cl.⁴ .................... F16F 9/20; F16F 9/30
[52] U.S. Cl. ........................ 188/282; 188/268; 188/312; 188/322.22; 267/64.13; 267/127
[58] Field of Search ........... 188/282, 317, 280, 322.15, 188/322.22, 312, 268; 267/120, 127, 64.13; 417/511

[56] References Cited

U.S. PATENT DOCUMENTS

| | | | |
|---|---|---|---|
| 821,359 | 5/1906 | Hoeberlein | 188/280 |
| 2,252,772 | 8/1941 | Katcher | 280/90 |
| 2,310,570 | 2/1943 | Briggs | 280/90 |
| 2,570,854 | 10/1951 | Pierce | 188/268 X |
| 2,606,760 | 8/1952 | Schlegel, Jr. | 267/64 |
| 2,953,810 | 9/1960 | Hall | 188/317 X |
| 3,379,319 | 4/1968 | Stasieluk | 188/268 X |
| 3,412,827 | 11/1968 | Brooks | 188/282 |
| 3,516,520 | 6/1970 | Agren et al. | 188/96 |
| 3,722,640 | 3/1973 | Taylor | 188/316 |
| 3,882,977 | 5/1975 | Watanabe | 188/322 |
| 3,981,380 | 9/1976 | Andre | 188/282 |
| 4,064,977 | 12/1977 | Taylor | 188/317 |
| 4,433,759 | 2/1984 | Ichinose | 188/322.15 X |

FOREIGN PATENT DOCUMENTS

| | | | |
|---|---|---|---|
| 1228154 | 11/1966 | Fed. Rep. of Germany | 188/282 |
| 2132605 | 1/1972 | Fed. Rep. of Germany | 188/282 |
| 2622879 | 11/1976 | Fed. Rep. of Germany | 188/282 |
| 1106930 | 12/1955 | France | 188/322.15 |
| 684221 | 9/1979 | U.S.S.R. | 188/282 |
| 218650 | 11/1924 | United Kingdom | 188/317 |

Primary Examiner—George E. A. Halvosa
Attorney, Agent, or Firm—Joseph P. Gastel

[57] ABSTRACT

A shock absorber having a casing containing compressible fluid and a piston head with structure for providing fluid amplification during normal piston head movement, the piston head having a central bore therein for slidably mounting the piston head for axial movement on the piston rod and being biased against a holding member by Bellville washers, a valve on the holding member obstructing conduits between the piston rod and the piston head when the piston head is biased against the holding member, the conduits being uncovered by the valve to permit flow therethrough from one side of the piston head to the other when the pressure in the shock absorber in the area of the holding member exceeds a predetermined value, the conduits between the piston head and piston rod being of a shape to provide a second stage of fluid amplified flow.

13 Claims, 2 Drawing Sheets

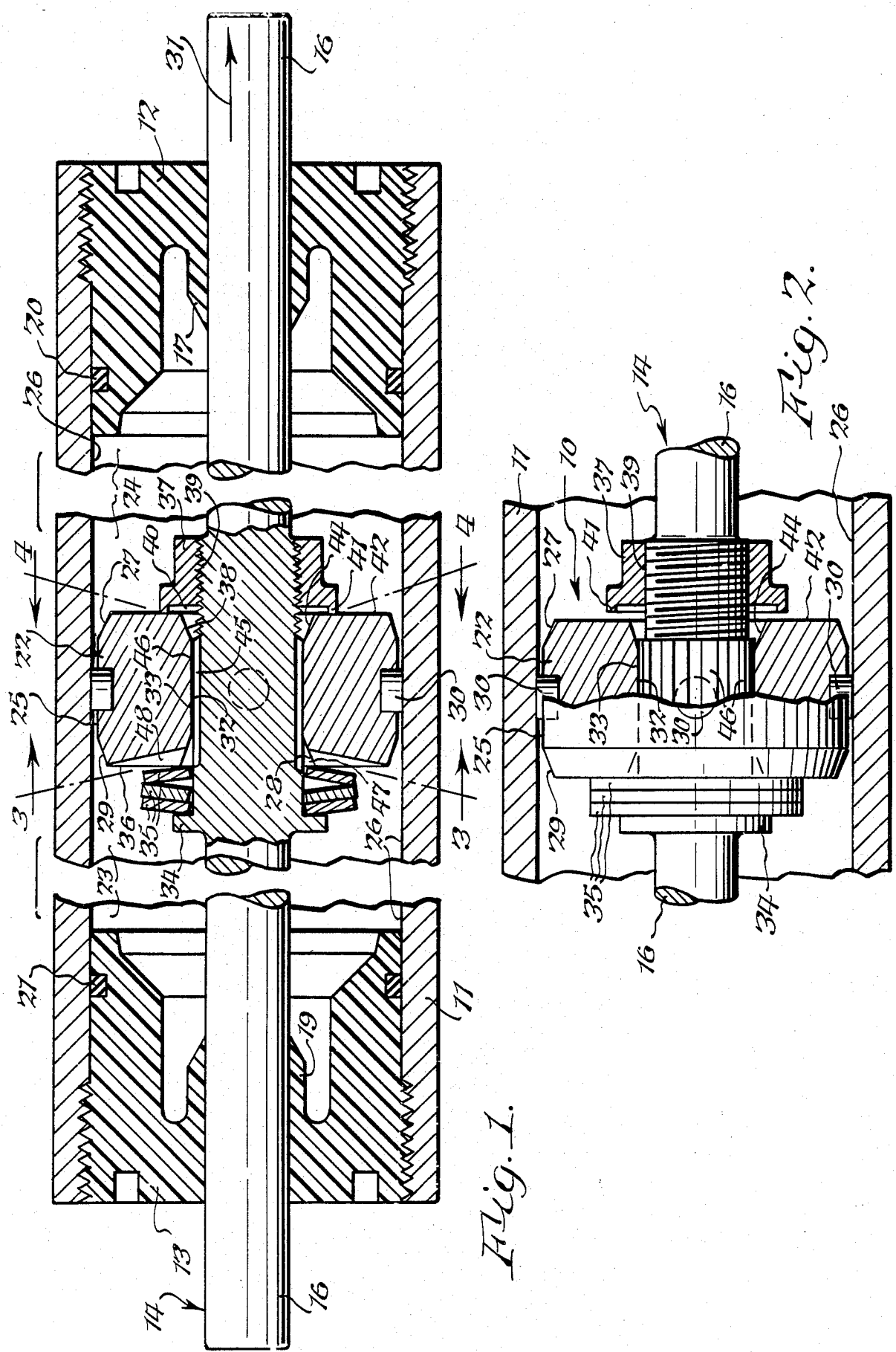

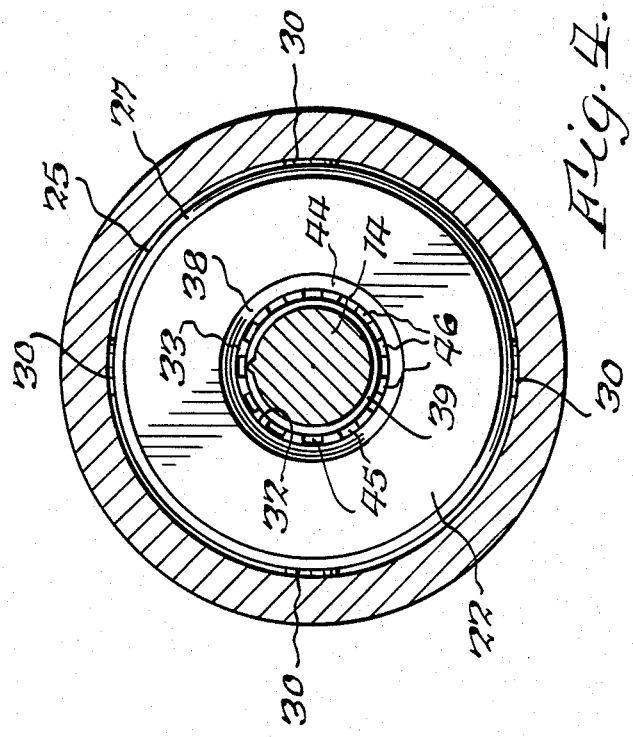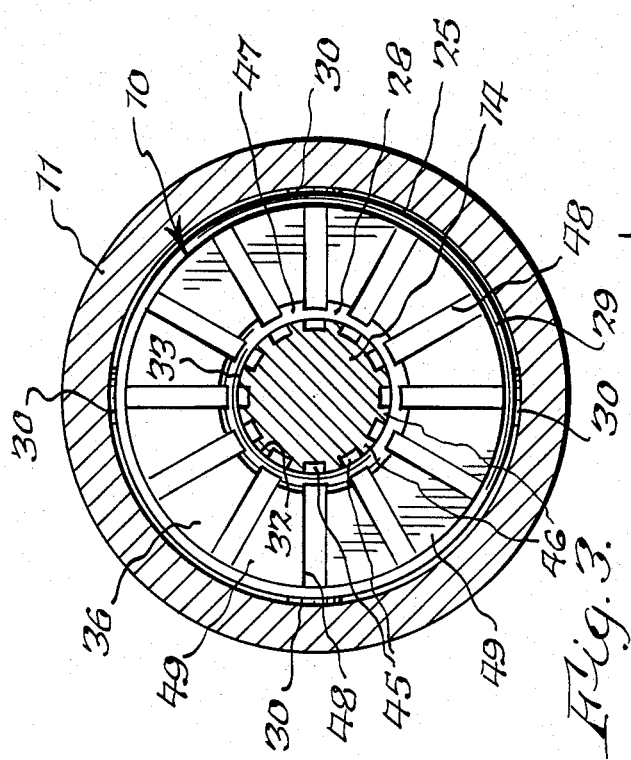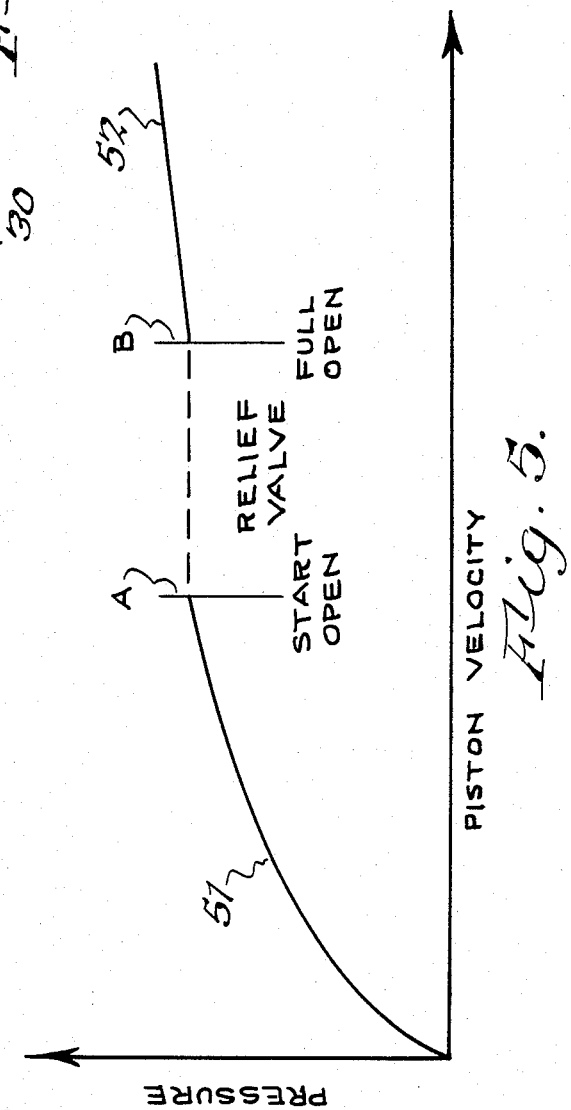

4,867,286

SHOCK ABSORBER HAVING FLUID AMPLIFIED PISTON HEAD WITH RELIEF VALVE WHICH PROVIDES SECOND STAGE OF FLUID AMPLIFICATION

BACKGROUND OF THE INVENTION

The present invention relates to an improved shock absorber of the type utilizing compressible fluid and a piston head capable of providing fluid amplified action.

By way of background, shock absorbers utilizing fluid amplified piston heads are known. Certain of these shock absorbers can operate in high pressure ranges of between about 10,000 to 15,000 pounds per square inch. However, under certain circumstances these shock absorbers may be subjected to extremely high piston velocities which tend to pressurize the fluid in excess of their normal high fluid pressure ranges. Providing pressure relief structure for the piston heads of these types of shock absorbers has been a problem because heretofore there was no known way of providing check valve structure on the piston heads which were operable at pressure ranges in excess of between 10,000 and 15,000 pounds per square inch because the springs for biasing the check valves could not be accommodated in the confined spaces of the shock absorber. Furthermore, while the use of Bellville washers for biasing check valves of piston heads was known, the Bellville washers applied their biasing forces against the check valves themselves, but this structure could not be used where the check valves were to control fluid flows in excess of the 10,000 to 15,000 pound per square inch range in a very limited space. Furthermore, even when the valve is opened, there is normally pressure relief to some extent, but the pressure then can build up excessively because the conduits which are opened are of a size which cannot accommodate sufficient fluid flow.

SUMMARY OF THE INVENTION

It is accordingly the object of the present invention to provide pressure relief structure for a shock absorber having a fluid amplified piston head which is operable in an extremely reliable manner at extremely high fluid pressures and which can be installed in an extremely confined space and which will provide a second stage of fluid amplification during pressure relief action. Other objects and attendant advantages of the present invention will readily be perceived hereafter.

The present invention relates to a shock absorber comprising a casing, a piston rod having a portion within said casing, compressible fluid in said casing, a piston head, first fluid amplification means on said piston head operable when said compressible fluid is subjected to pressures below a predetermined value, pressure relief means on said piston head, and second fluid amplification means operable to provide a second stage of fluid amplification when said compressible fluid is subjected to pressures above said predetermined value. The various aspects of the present invention will be more fully understood when the following portions of the specification are read in conjunction with the accompanying drawings wherein:

BRIEF DESCRIPTION OF THE DRAWINGS

FIG. 1 is a fragmentary cross sectional view of a shock absorber mounting the improved piston head construction of the present invention with the piston head in a normal operating position;

FIG. 2 is a view partially in cross section of the piston head construction assuming a position wherein it provides pressure relief;

FIG. 3 is a cross sectional view taken substantially along line 3—3 of FIG. 1;

FIG. 4 is a cross sectional view taken substantially along line 4—4 of FIG. 1; and FIG. 5 is a graph depicting the action of the pressure relief valve.

DESCRIPTION OF THE PREFERRED EMBODIMENTS

The present invention relates to a shock absorber which includes an improved piston head assembly 10. The shock absorber includes an annular casing 11 having end walls 12 and 13 threadably mounted at opposite ends thereof. Piston rod 14 includes an inner portion which is located within casing 11 and outer portions 16 which are located outside of casing 11. End walls 12 and 13 may be fabricated of high strength plastic and may include integral annular lip-like seals 17 and 19, respectively, which provide sealing engagement with piston rod 14. O-rings 20 and 21 are mounted in suitable grooves in end walls 12 and 13, respectively, to provide sealing with casing 11. End walls 12 and 13 may also be fabricated of high strength composite materials, such as a combination of glass fibers and resin, or they may be fabricated of metal and include separate seals. Piston head 22, which is mounted on piston rod 14, divides casing 11 into chambers 23 and 24, which contain suitable compressible fluid. Such fluids may be silicone liquid which is 9.6% compressible at 20,000 psi, or freon which is about 25% compressible at 20,000 psi, or butane which is 20–25% compressible at 20,000 psi, or any other suitable compressible liquid which provides significant compressibility at high pressures.

Piston head 22 includes an outer peripheral surface having central annular portion 25 which extends substantially parallel to inner cylindrical wall 26 of casing 11, an inclined annular portion 27 to one side of central portion 25 and an inclined annular portion 29 on the opposite side of central portion 25. Four equally spaced spacer discs 30 are mounted on central portion 25 to engage inner cylindrical surface 26 and thus maintain piston head 22 in uniformly spaced relationship with respect thereto. As is well understood in the art relating to fluid amplified piston heads, as piston rod 16 moves in the direction of arrow 31, a substantially square energy wave will be generated as the shock absorber absorbs the energy of forces applied thereto. Fluid amplification by a piston head having an outer configuration, such as shown in FIG. 1, is fully disclosed and explained in U.S. Pat. No. 3,722,640, which is incorporated herein by reference.

In accordance with the present invention, structure is associated with piston head 22 for providing pressure relief in chamber 24 in the event that there are excessive piston velocities which will cause pressure, build-up in chamber 24 which cannot be handled by the fluid amplified piston head structure. In this respect, piston head 22 includes a bore 32 which is slightly larger than the diameter of piston rod portion 33 so that there is a rectilinear sliding fit therebetween. The ends of bore 32 merge into flared annular portions 28 and 38. An annular abutment 34 is formed on piston rod 16, although abutment 34 may be a separate member attached to piston 16, as by a threaded connection. A plurality of Bellville washers 35 are interposed between abutment 34 and a first face 36 of piston head 22 so as to bias the latter to the right (FIG. 1) against holding member 37 in the form of a nut which is threadably mounted on piston rod 16 at 39. An annular recess 40 is provided in holding member 37, and the holding member includes a rim 41 which bears against the second face 42 of piston head 22. Thus, rim 41 acts as a valve to block chamber 24 from a plurality of axially extending grooves 45 equally circumferentially spaced between axially extending ribs 46 on the portion of the piston rod located within piston head bore 32. Flared portions 38 and 28 surround open areas 44 and 47, respectively. Grooves 45 are in communication with open area 47 which, in turn, is in communication with equally circumferentially spaced radial grooves 48 located between radial ribs 49 in piston head face 36. The Bellville washer 35 closest to face 36 abuts ribs 49 to bias piston head 22 against rim 41 of holding member 37. The inclination to the horizontal of flared portions 28 and 38 may be between about 3° and 20°, but they may be of any angle depending on the characteristics of the fluid amplification which are required.

During normal piston movement to the right wherein the pressure within chamber 24 does not exceed a redetermined value, the piston head 22 will remain mounted on piston rod 16 in the manner shown in FIG. 1 wherein rim 41 blocks annular open area 44, and compressible fluid will flow from chamber 24 to chamber 23 through the peripheral space between the outside surfaces 25, 27, 29 of the piston head and internal surface 26 of cylinder 11. However, in certain circumstances wherein the piston velocity during movement to the right exceeds the value at which fluid may be transferred from chamber 24 to chamber 23 in a fluid amplified mode, piston head 22 will move to the left on piston rod 14 against the bias of Bellville washers 35 toward the position shown in FIG. 2 wherein the washers tend to assume a flattened condition. As soon as annular open area 44 is uncovered, pressure begins to be relieved in chamber 24.

The operation of the shock absorber is depicted in FIG. 5 wherein line 51 depicts the force applied against side 42 of piston head 22 in relationship to the piston velocity. A point will be reached where Bellville washers 35 begin to flatten out and this is shown on the graph as the point A at which piston head 22 moves away from holding member 37 so that the open area 44 is uncovered and placed in communication with chamber 24 to provide a relief valve action. Movement of piston head 22 will continue until Bellville washers are flattened or until they counteract the pressure in chamber 24. The fully flattened condition of washers 35, that is when the valve is fully opened, is represented by point B in FIG. 2. If the piston velocity should continue to increase, there will be a relatively shallow application of force as depicted by graph portion 52 because the openings 44, 45, 47 function to provide a second range of fluid amplification of liquid passing from chamber 24 to chamber 23, and this aids in avoiding excessive pressure build-up in chamber 24 in spite of excessive piston velocities in the direction of arrow 31. After the piston velocity decreases to a value A, the valve will close, and it starts its closing from a fully open position at piston velocity value B.

It can thus be seen that there is a two-stage fluid amplification action. The first stage is when rim valve 41 is closed so that fluid flow is around the outside of the piston, and the second stage is when fluid flow is through the space between the piston rod and the piston.

The advantage of having the Bellville washers 35 bearing directly against the piston head 22 is that much heavier spring pressures can be applied to the piston head and thus to the valve portion 41 of the holding member 37 than if the washers bore directly against a movable valve member which was mounted directly on a piston head which was fixedly mounted on its associated piston rod. Furthermore, with the movable piston head construction of the present invention, there is a uniform release of pressure because the piston head 22 will tend to move in a perfectly rectilinear path, whereas if heavy spring pressures were applied to valve members mounted on a piston head fixedly secured to a piston rod, the valve members wound tend to cock and thus would not produce the uniform pressure release. Because of the foregoing construction, the shock absorber of the present invention can be used in environments where it is subjected to extremely high forces which would cause the fluid to be subjected to pressures in excess of between about 10,000 and 15,000 pounds per square inch and there will be no distortion, considering that the Bellville washers exert their force directly against the piston head rather than valve members mounted thereon. Furthermore, the Bellville washers are capable of providing the extremely high forces required under the foregoing circumstances while still occupying a relatively limited space. As noted above, holding member or nut 37 is screwed onto piston rod 16. By varying its axial position, the point at which the piston head starts to move away from the holding member to open conduits 45 can be adjusted. Therefore, if holding member 37 is screwed up tight, the piston head 22 will start its movement at higher pressures than if the holding member was screwed up more loosely.

Essentially the above-described structure consists of a pressure-responsive piston head and valve construction wherein the piston head has limited sliding motion on a shaft and will yield only to provide pressure relief when the pressure of fluid exceeds the bias of Bellville washers holding the piston head in its normal mounted position. Furthermore, even after there is pressure relief due to movement of the piston head away from rim 41, there will be a second stage of fluid amplified action. It can thus be seen that the foregoing construction extends the range of the fluid amplified head, as can readily be seen from the graph of FIG. 5. By extending the range is meant that the existing shock absorber can accommodate greater piston velocities than if the movable head with the added fluid amplification stage was not utilized.

While a double-ended piston rod has been shown, it will be appreciated that the piston rod may be single-ended, that is, the piston head may be mounted on the end portion of the rod within the cylinder.

It can thus be seen that the improved structure of the present invention is manifestly capable of achieving the above-enumerated objects, and while preferred embodiments of the present invention have been disclosed, it is to be understood that the present invention is not limited thereto but may be otherwise embodied within the scope of the following claims.

I claim:

1. In a shock absorber having a casing, a piston rod having a first portion in said casing and a second portion extending outwardly beyond said casing, compressible fluid within said casing, a piston head having first and second opposite sides, fluid amplification means on said piston head for providing a stage of fluid amplification, and first and second chambers in said casing on said first and second opposite sides of said piston head, respectively: the improvement comprising a bore in said piston head for receiving said first portion of said piston rod, an abutment on said first portion of said piston rod spaced from said first side of said piston head, spring means positioned between said abutment and said first side of said piston head, holding means on said first portion of said piston rod in engagement with said second side of said piston head under the bias of said spring means, conduit means between said piston head and said piston rod extending between said first and second sides, valve means on said holding means for normally closing said conduit means when said second side is in engagement with said holding means, and a slidable connection between said bore and said first portion of said piston rod for permitting said piston head to move toward said abutment against the bias of said spring means when the fluid force in said second chamber on said second side of said piston head exceeds the biasing force of said spring means to thereby cause said valve means to uncover said conduit means to permit flow of fluid from said second chamber to said first chamber, said conduit means including a central portion of a first effective diameter and outwardly flared ends of increasing second diameters at both opposite end portions of said conduit means to provide a second stage of fluid amplification during pressure relief action in addition to the stage of fluid amplification provided by said fluid amplification means on said piston head.

2. In a shock absorber as set forth in claim 1 wherein said spring means comprise Bellville washer means.

3. In a shock absorber as set forth in claim 1 including adjustable securing means for securing said holding means to said first portion of said piston rod for adjusting the biasing force of said spring means by slidably moving said piston head relative to said abutment.

4. In a shock absorber as set forth in claim 3 wherein said spring means comprise Bellville washer means.

5. In a shock absorber as set forth in claim 3 wherein said adjustable securing means comprises a threaded connection between said first portion f said piston rod and said holding means.

6. In a shock absorber as set forth in claim 5 wherein said holding means comprises a nut.

7. In a shock absorber as set forth in claim 1 wherein said conduit means comprise a plurality of grooves between said piston head and said piston rod, and wherein said slidable connection comprises a bore in said piston head for mounting said piston head on said piston rod.

8. In a shock absorber as set forth in claim 7 including a plurality of radial ribs on said first side of said piston in engagement with said spring means, and a plurality of second grooves between said radial ribs in communication with said grooves.

9. In a shock absorber as set forth in claim 1 wherein said conduit means are of a shape to provide said second stage of fluid amplification substantially throughout the entire range of movement of said piston head.

10. A shock absorber comprising a casing, a piston rod having a portion within said casing, compressible fluid in said casing, a piston head, first fluid amplification means on said piston head operable when said compressible fluid is subjected to pressures below a predetermined value, pressure relief means on said piston head, and second fluid amplification means operable to provide a second stage of fluid amplification when said compressible fluid is subjected to pressures above said predetermined value.

11. A shock absorber as set forth in claim 10 wherein said second fluid amplification means comprises a bore in said piston head, and wherein said pressure relief means comprises valve means for selectively permitting said compressible fluid to pass through said bore.

12. A shock absorber as set forth in claim 11 wherein said piston head includes a central portion surrounding said bore, means on said central portion for slidable engagement with said piston rod, groove means between said central portion and said piston head, and outwardly flared ends at both supports ends of said central portion surrounding said bore.

13. A shock absorber as set forth in claim 12 spring means between said piston rod and said piston head for biasing said piston head to a position wherein said pressure relief means are closed, and a plurality of radial grooves in said piston head proximate said spring means for conducting fluid from said groove means.

* * * * *

UNITED STATES PATENT AND TRADEMARK OFFICE
CERTIFICATE OF CORRECTION

PATENT NO. : 4,867,286

DATED : September 19, 1989

INVENTOR(S) : Douglas P. Taylor

It is certified that error appears in the above-identified patent and that said Letters Patent is hereby corrected as shown below:

Column 2, line 60, cancel the comma.

Column 3, line 25, change "rede-" to --prede- --.

Column 5, line 45 (claim 5), change "f" to --of--.

Column 6, line 38 (claim 12), change "supports" to --opposite--.

Column 6, line 40 (claim 13), after "12" insert --including--.

Signed and Sealed this

Fourteenth Day of August, 1990

Attest:

HARRY F. MANBECK, JR.

Attesting Officer

Commissioner of Patents and Trademarks